US010933356B2

(12) United States Patent
Richardson

(10) Patent No.: US 10,933,356 B2
(45) Date of Patent: Mar. 2, 2021

(54) FILTER PANEL WITH MACRO, MICRO AND NANO STRUCTURES

(71) Applicant: Imagine TF, LLC, Campbell, CA (US)

(72) Inventor: Brian Edward Richardson, Los Gatos, CA (US)

(73) Assignee: Imagine TF, LLC, Campbell, CA (US)

( * ) Notice: Subject to any disclaimer, the term of this patent is extended or adjusted under 35 U.S.C. 154(b) by 0 days.

(21) Appl. No.: 16/660,842

(22) Filed: Oct. 23, 2019

(65) Prior Publication Data

US 2020/0122063 A1     Apr. 23, 2020

Related U.S. Application Data

(60) Provisional application No. 62/766,522, filed on Oct. 23, 2018.

(51) Int. Cl.
*B01D 29/46*      (2006.01)
*B01D 46/40*      (2006.01)
*B07B 1/46*       (2006.01)

(52) U.S. Cl.
CPC ........... *B01D 29/46* (2013.01); *B01D 46/406* (2013.01); *B07B 1/4663* (2013.01)

(58) Field of Classification Search
CPC .............................. B01D 29/46; B01D 46/406
See application file for complete search history.

(56) References Cited

U.S. PATENT DOCUMENTS

| 6,685,833 B2 * | 2/2004 | Lippold | B01D 29/012 210/493.1 |
| 2010/0326027 A1 * | 12/2010 | Treier | F02M 35/024 55/498 |
| 2015/0314241 A1 * | 11/2015 | Hester | B29C 43/222 96/9 |
| 2020/0078710 A1 * | 3/2020 | Richardson | B32B 3/30 |

FOREIGN PATENT DOCUMENTS

KR       1020190043981 A  *  4/2019

* cited by examiner

*Primary Examiner* — Waqaas Ali
(74) *Attorney, Agent, or Firm* — Keith Kline; The Kline Law Firm PC

(57) ABSTRACT

This disclosure relates a fluid filter whose pores are created by raised structures on a base. The raised structures may be macro, micro and/or nanometer scale structures. The structures can be configured in myriad ways to control flow rate and extracted particle size of a filtering system. Typically a plurality of filter panels will be stacked to form a filtering unit.

9 Claims, 25 Drawing Sheets

FILTER PANEL WITH MACRO, MICRO AND NANO STRUCTURES

RELATED APPLICATIONS

This application claims priority of U.S. Provisional application Ser. No. 62/766,522, filed Oct. 23, 2018, the disclosure of which is hereby incorporated by reference for all purposes.

FIELD OF THE PRESENT DISCLOSURE

This disclosure relates to a fluid filter whose pores are created by macro, micro, and/or nanometer scale structures created on the surface of a substrate. The structures are arranged to create macro and micro channels to control the flow of fluids to and from the filter pores.

SUMMARY

A number of embodiments of the present disclosure are directed to a device for the filtration of fluids. For discussion a simple housing is disclosed to discuss how the filter elements could be deployed. The invention is not limited to usage in the disclosed housing. One skilled in the art of housing design could develop many other ways to deploy the filter elements. Generally, a fluid enters the filter element from the edge. On the surface of the filter element there are primary and secondary structures to create macro and micro channels. The primary structures create channels that direct the flow to the secondary structures. The secondary structures are spaced away from a mating flat surface. The space created by the space creates pores to filter particles from the fluid. These structures can be molded from tooling fabricated with great accuracy and can be molded inexpensively. Roll to roll manufacturing equipment can be used to mold the structures in a film at low cost. Further the amount of material required to fabricate each filter element is small. This results in a small overall filter package and a low cost to fabricate.

The filter can be used for the filtration and or separation of particles from gases, liquids and a flow including solid particles. A wide range of materials can be used to fabricate the filters, from inexpensive plastics to materials that are durable at high temperatures, such as silicon. By fabricating mold tooling or filter parts with semiconductor processing equipment single digit nanometer scale pores can be created. Further, pore consistency can be single digit nanometer as well.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 19b shows an alternate configuration of FIG. 19a.

DESCRIPTION OF EXEMPLARY EMBODIMENTS

The present disclosure is generally directed to a device for filtration where the pores and fluidic channels are created with macro, micro and nanometer scale structures located on the surface of a substrate.

Figure 1:
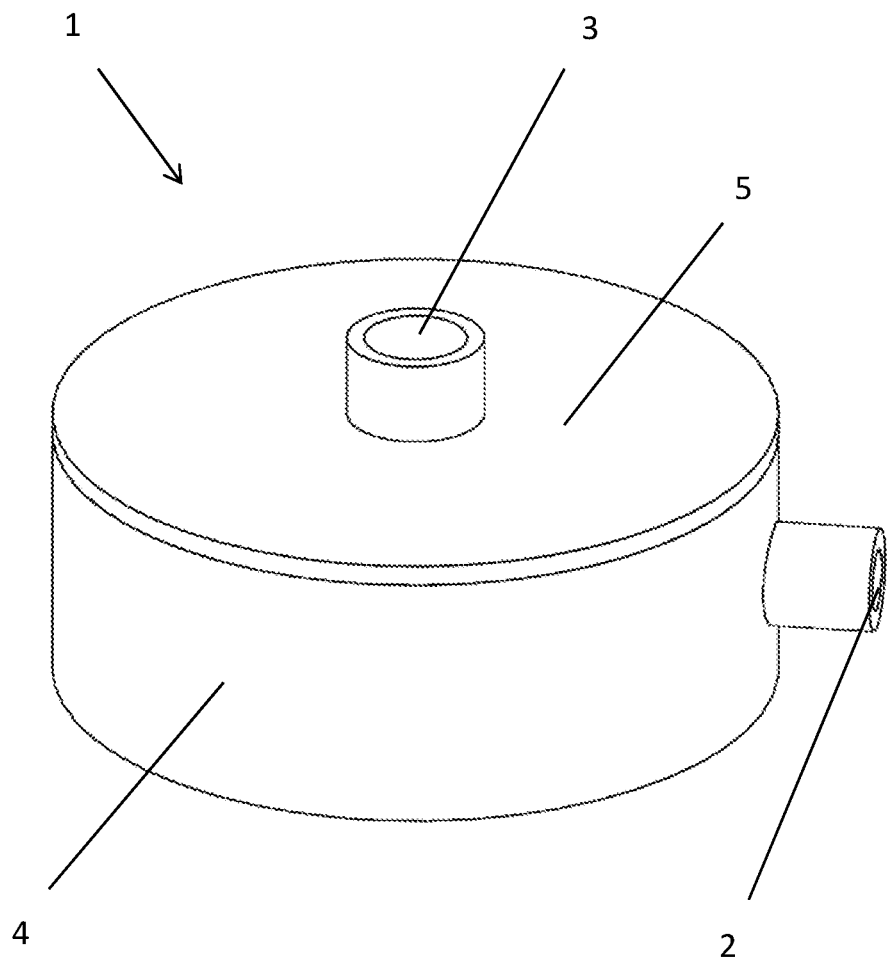
FIG. 1 is a perspective view of the filter housing.

FIG. 1 is an exterior view of the filter assembly 1. The filter assembly 1 includes a filter housing 4 with a cover 5. Fluids enter the housing 4 at the inlet 2. The filtered fluid exits the housing 4 at the outlet 3.

Figure 2:
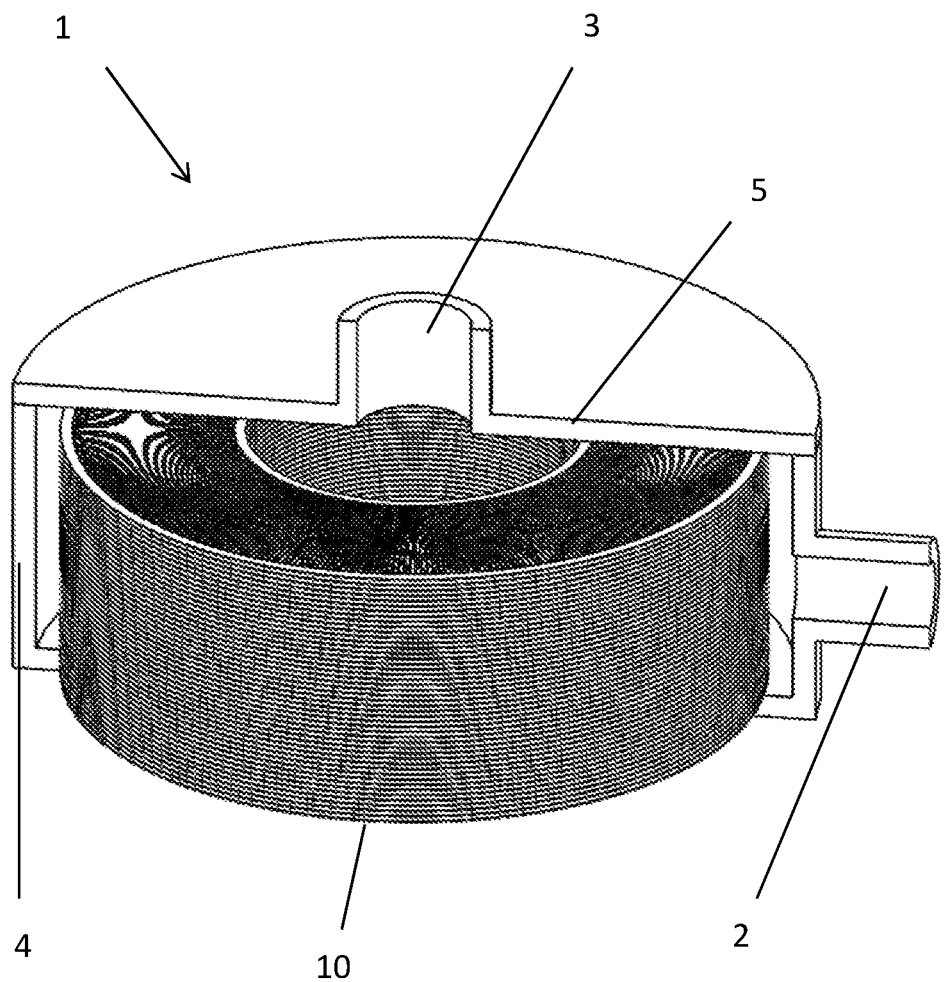
FIG. 2 is a perspective view of the filter housing shown in FIG. 1 with a section of the housing removed to expose the elements inside the housing.

FIG. 2 is a sectional view of FIG. 1, so that the interior of the filter assembly 1 can be seen. Inside the housing 4 a filter stack 10 can be seen. The top and bottom of the filter stack 10 are sealed against the inside top and inside bottom surfaces of the housing. The mating of these surfaces ensures that no fluid bypasses the filter stack, i.e. no fluid flows through the housing 4 without going through the filter stack 10. The inlet 2 and the walls of the housing 4 direct fluids to the outside perimeter of the filter stack 10. The top and bottom walls of the housing 4 ensure that the fluid exiting the filter stack 10 is directed only to the outlet 3. It should be noted that the housing is easily modifiable. It can be of many configurations depending on a given application. One skilled in the art could devise may types of housings that would suffice.

Figure 3:
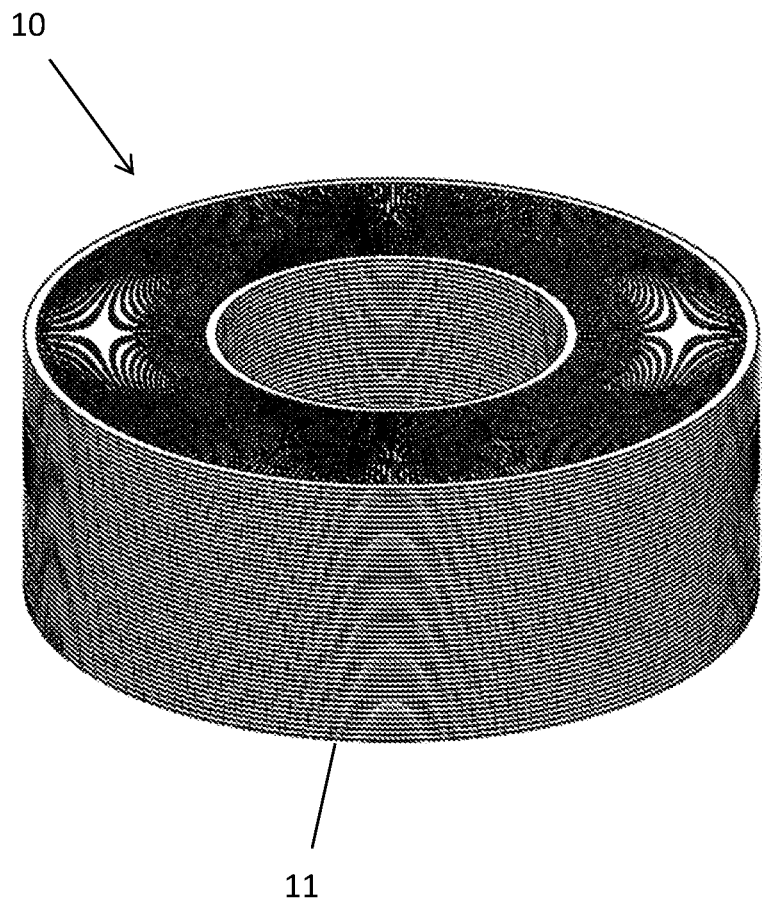
FIG. 3 is a perspective view showing only the components, disk stack inside the housing and none of the housing.

FIG. 3 shows an exemplary filter stack 10. The filter stack 10 includes a plurality of filter panels 11 stacked on top of one another. The top surface of one filter panel 11 is in physical contact with the bottom surface of the filter panel 11 located above. The filter panels 11 are typically made from, but are not limited to, thin plastic material. The overall height of a filter panel 11 might be only 200 microns. A typical filter stack 10 might contain a few hundred filter panels 11. In the case of 300 filter panels 11 at a thickness of 200 microns the height of the filter stack 10 would be only 60 mm (2.36") tall. The filter panels 11 are connected to one another with the bottom flat surface of one filter panel 11 mated to the top flat surface of a second filter panel 11. The top surface features of the filter panels 11 are better seen in subsequent figures.

Figure 4:
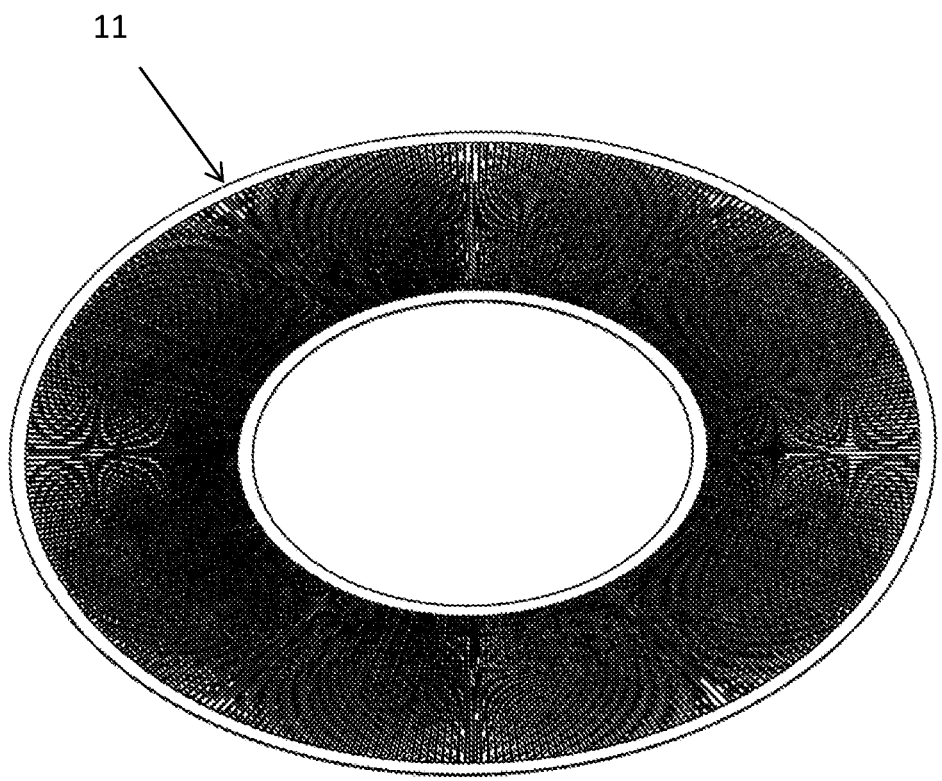
FIG. 4 is a perspective view only one of the filter disks.
Figure 5:
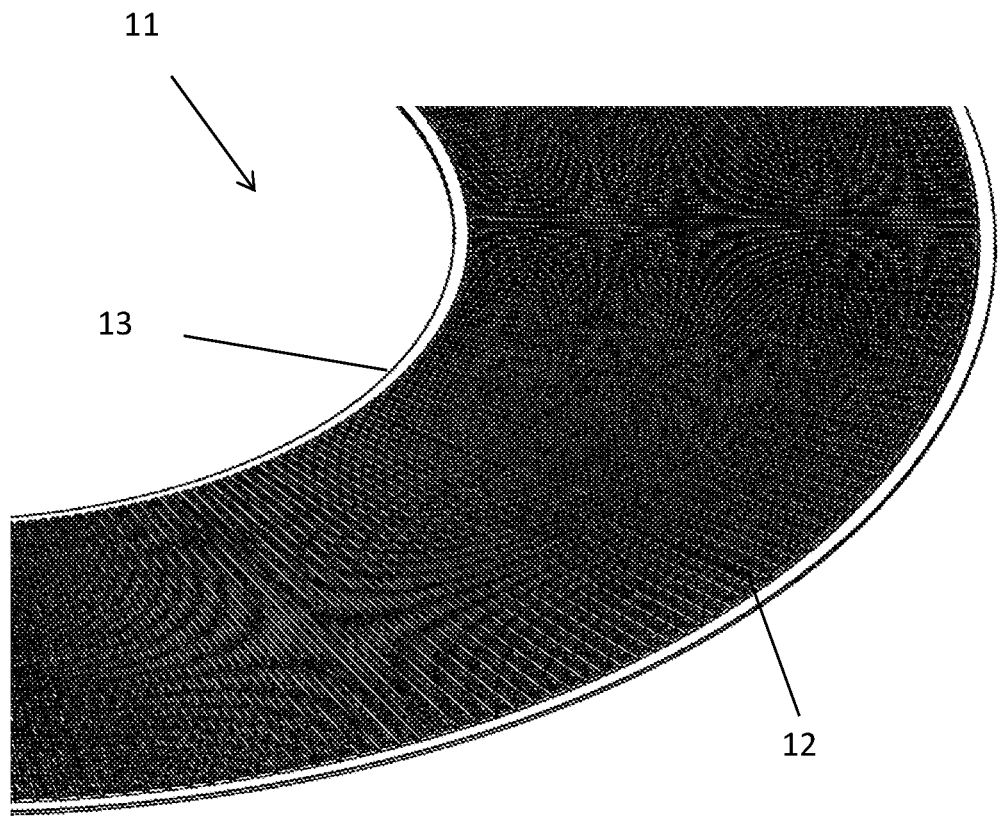
FIG. 5 is a closeup view of FIG. 4 showing details of the filter disk in greater detail.
Figure 6:
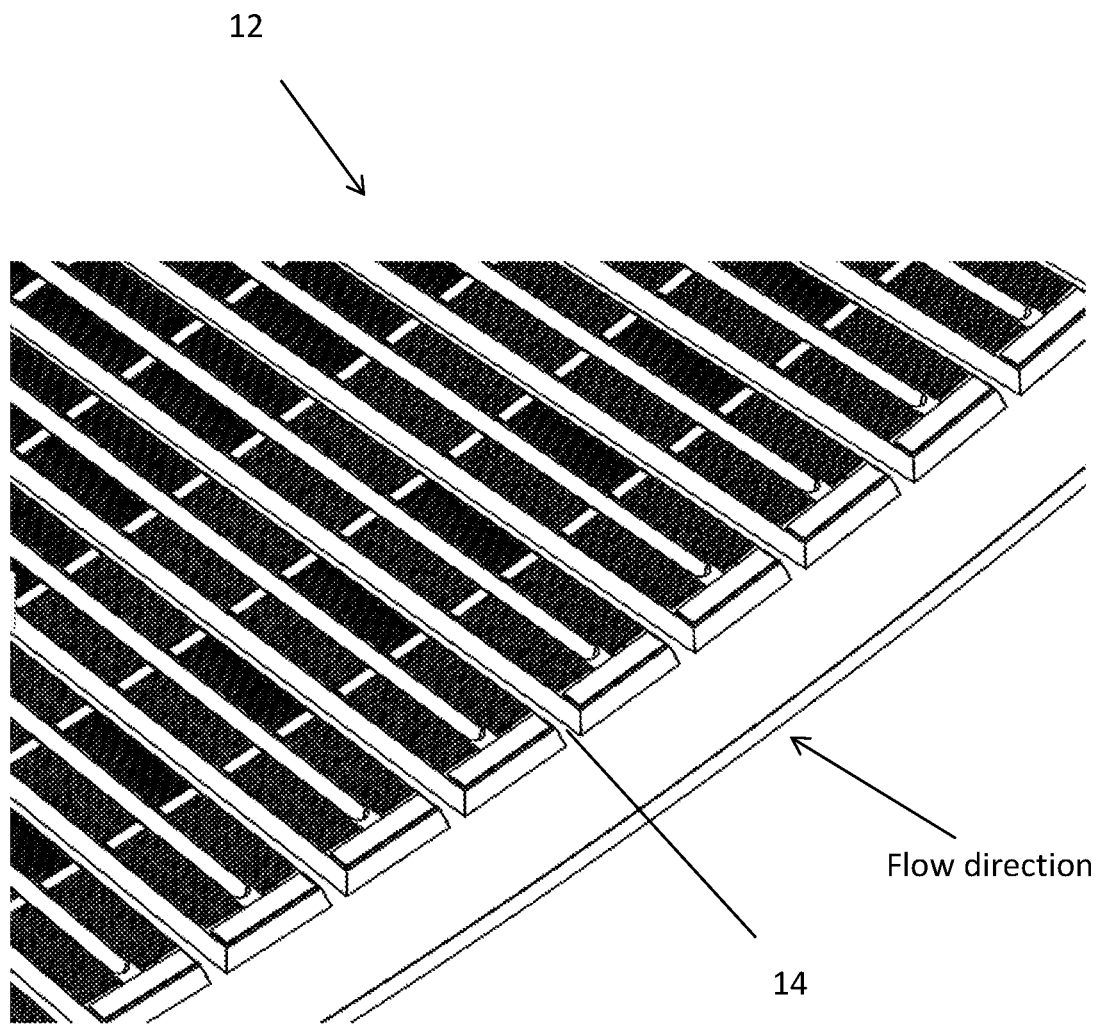
FIG. 6 is a view of the inlet area of the filter disk shown in FIG. 5 shown with greater magnification and shows the inlet area of the disk filter.
Figure 7:
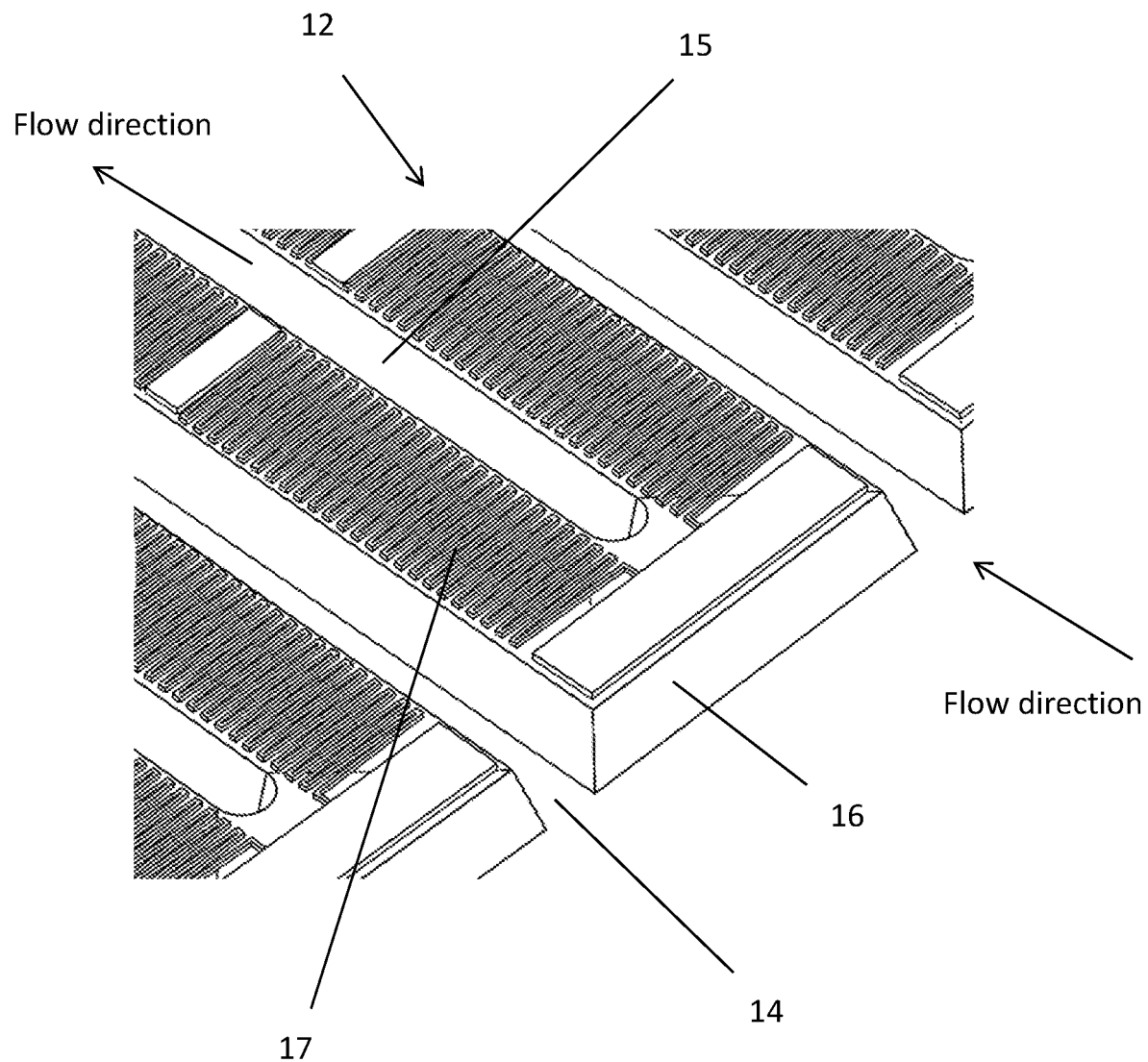
FIG. 7 is a close-up view FIG. 6, even greater magnification.
Figure 8:
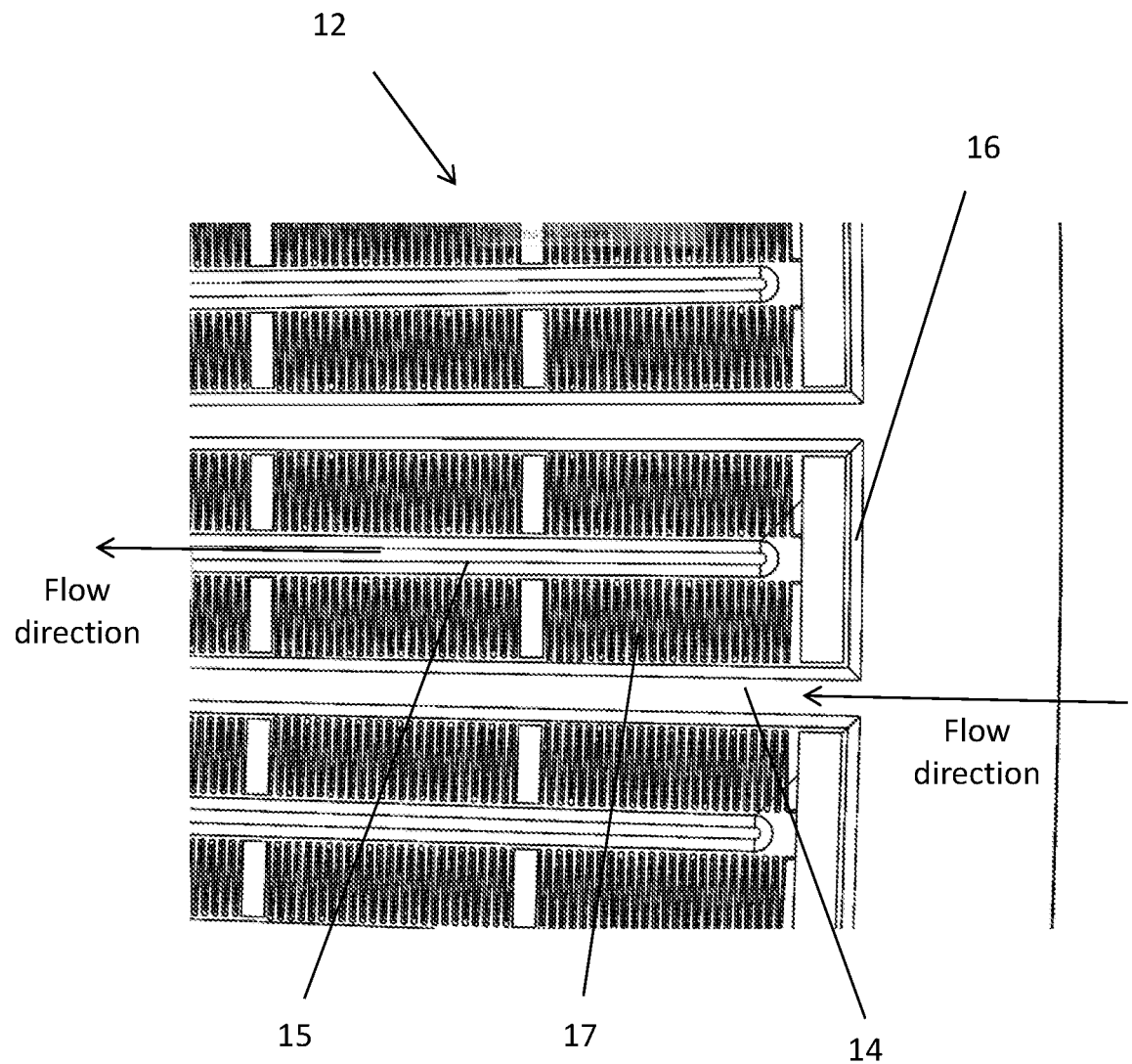
FIG. 8 is a top view of what is illustrated in FIG. 7.
Figure 9:
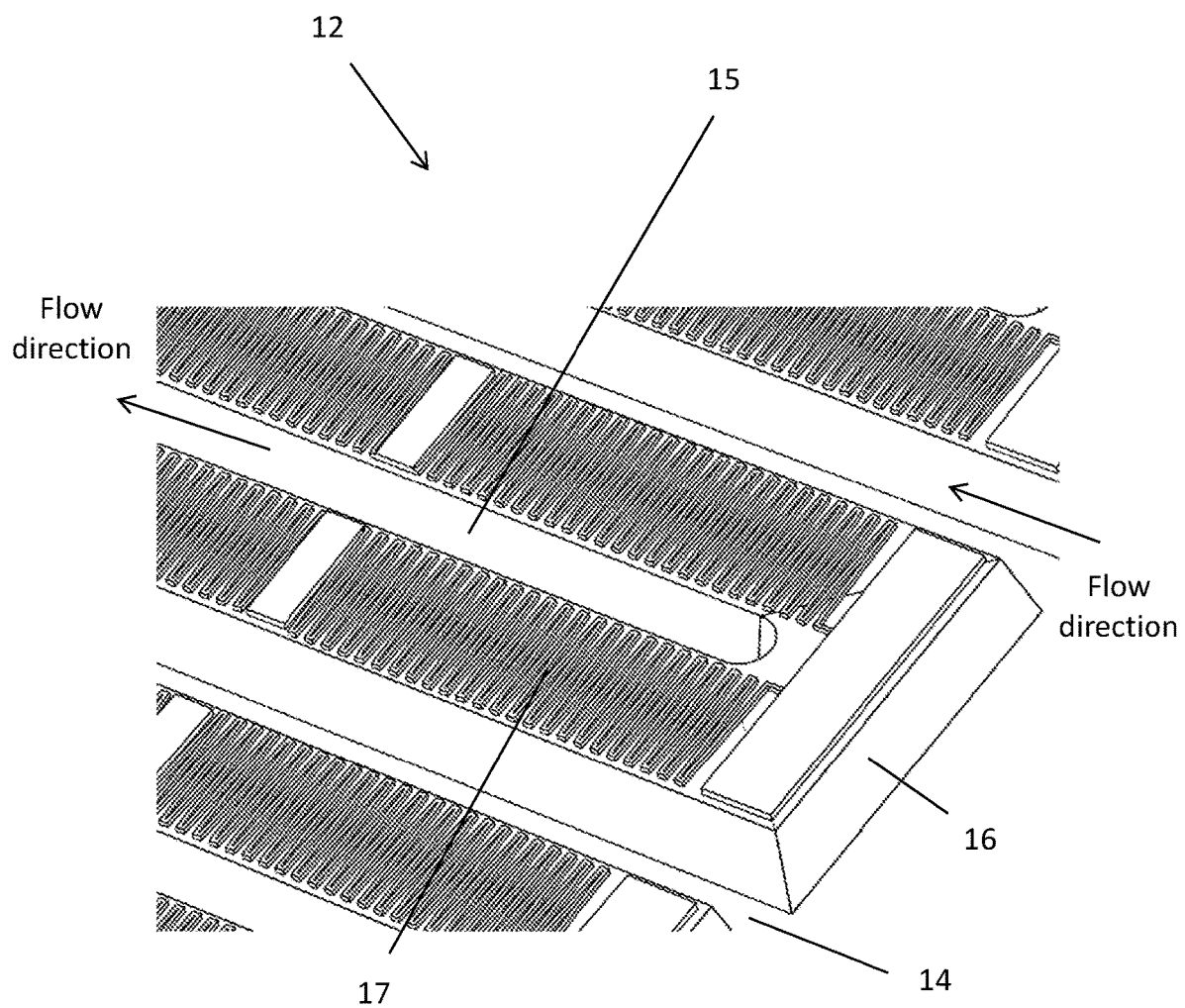
FIG. 9 is an even closer view of FIG. 7.
Figure 10:
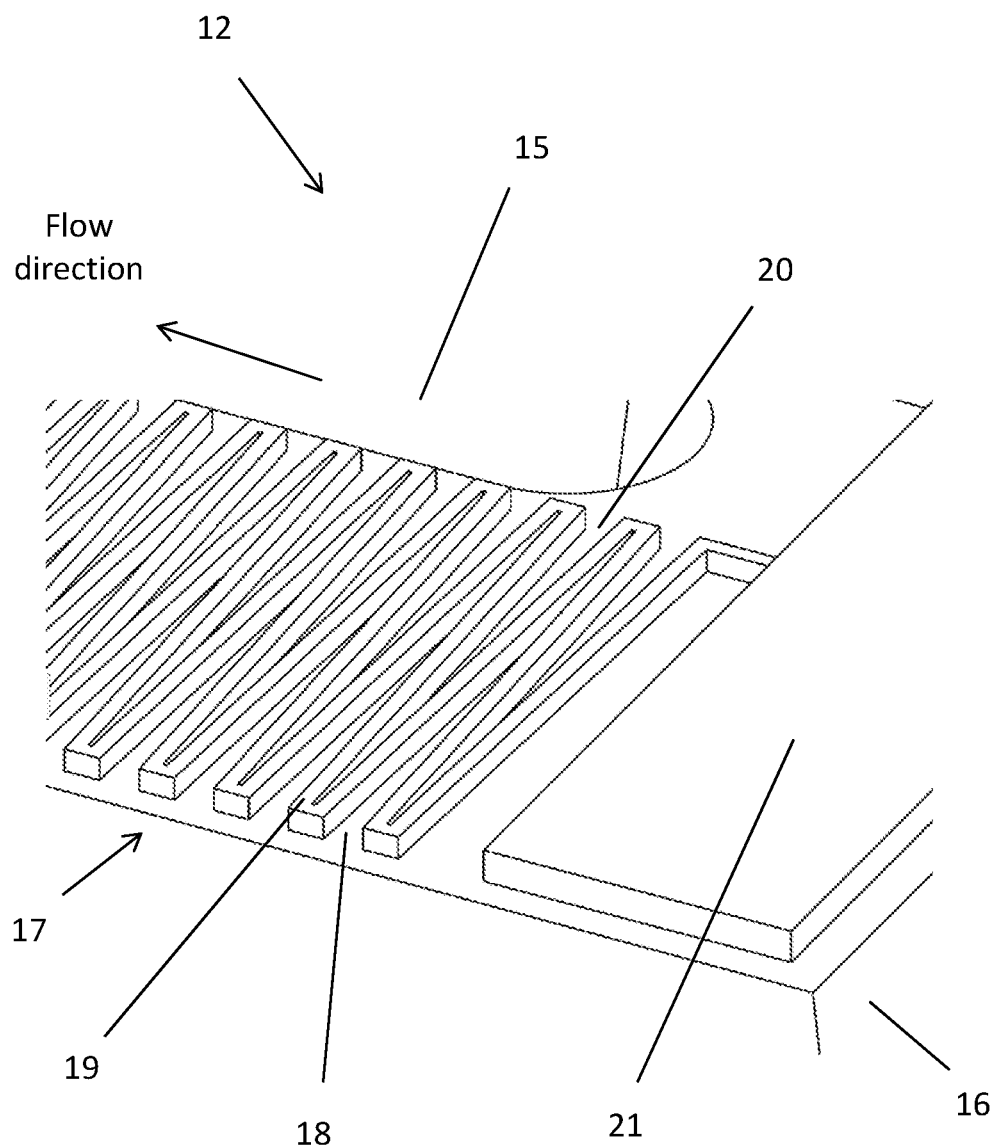
FIG. 10 is even closer than the view of FIG. 9.

FIGS. 4 and 5 show the filter panel 11 in greater detail. FIG. 5 identifies an outboard section 12 and an inboard section 13. The outboard section 12 can be seen in sequentially greater magnification in FIGS. 6 through 10.

In FIG. 6 through FIG. 10, arrows identify the direction of fluid flow into the outboard section 12 in filter panel 11. V inlet channels 14 and V outlet channels 15 are formed from the spaces between primary structures 16. Fluid flows into the V inlet channels 14 from the edge of the filter panel 11. The primary structures 16 forming the V inlet and outlet channels 14 and 15 are arrayed on the surface of the filter panel 11. The primary structures 16 might be from fifty microns to a few hundred microns high. The top surfaces of the primary structures 16 include contain both micro wall areas 17 and raised pads 21.

The micro wall areas 17 further include "W" shaped micro W walls 19, W wall inlets 18, and W wall outlets 20. Fluid flows into the filter panel 11 through the V inlet channels 14 and into the W wall inlets 18. The fluid flows down the V shaped channels from by the micro W walls 19. The micro W walls 19 might be ten or so microns tall. Fluid flows over the top surface of the micro W walls 19 and into the W wall outlets 20.

Figure 11:
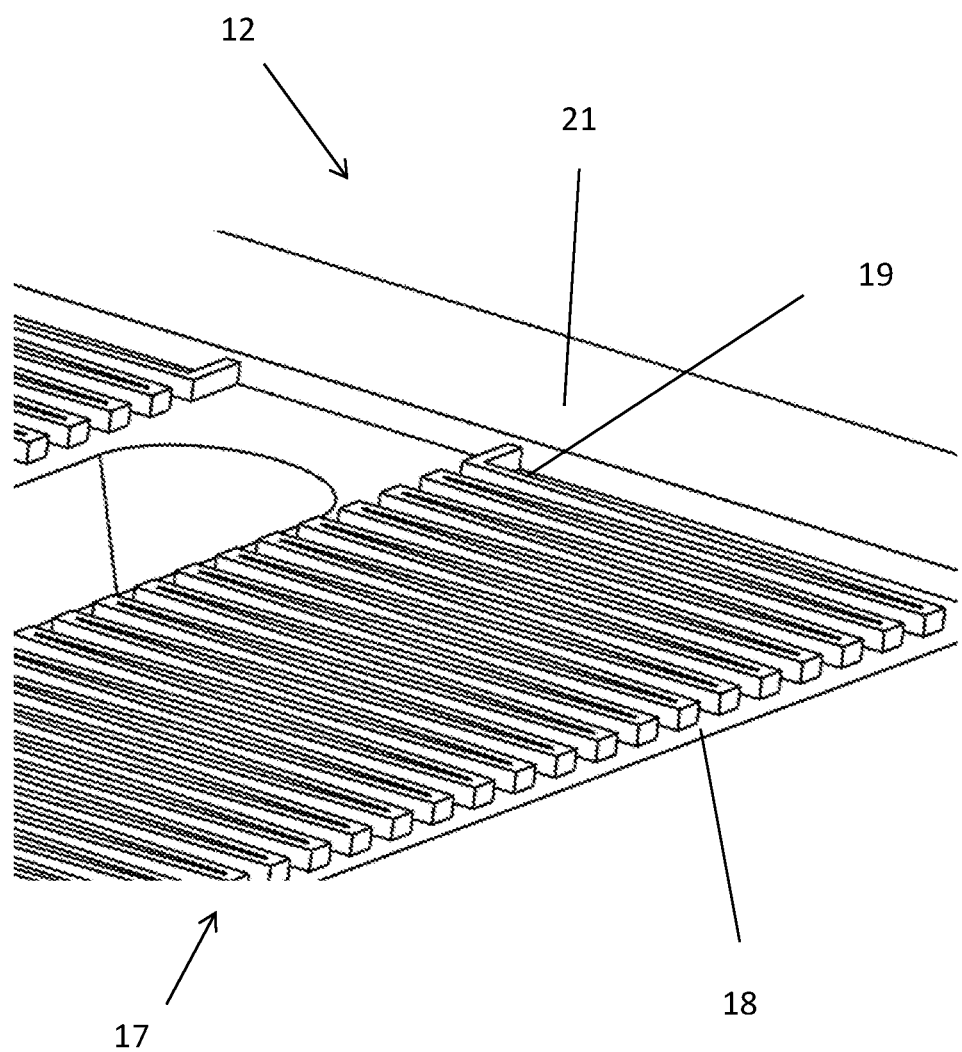
FIG. 11 is the generally the same area shown in FIG. 10 from a slightly different perspective angle.
Figure 12:
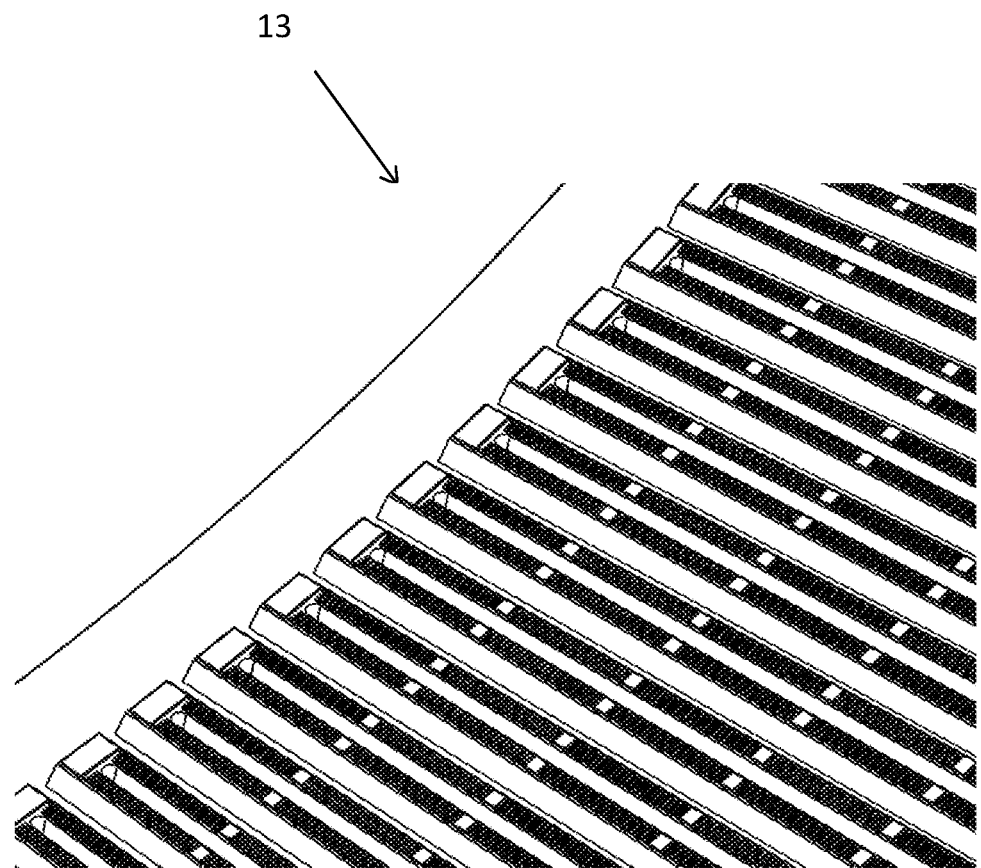
FIG. 12 is a view of the inboard section of the filter disk shown in FIG. 5 shown with greater magnification and shows the outlet area of the disk filter.
Figure 13:
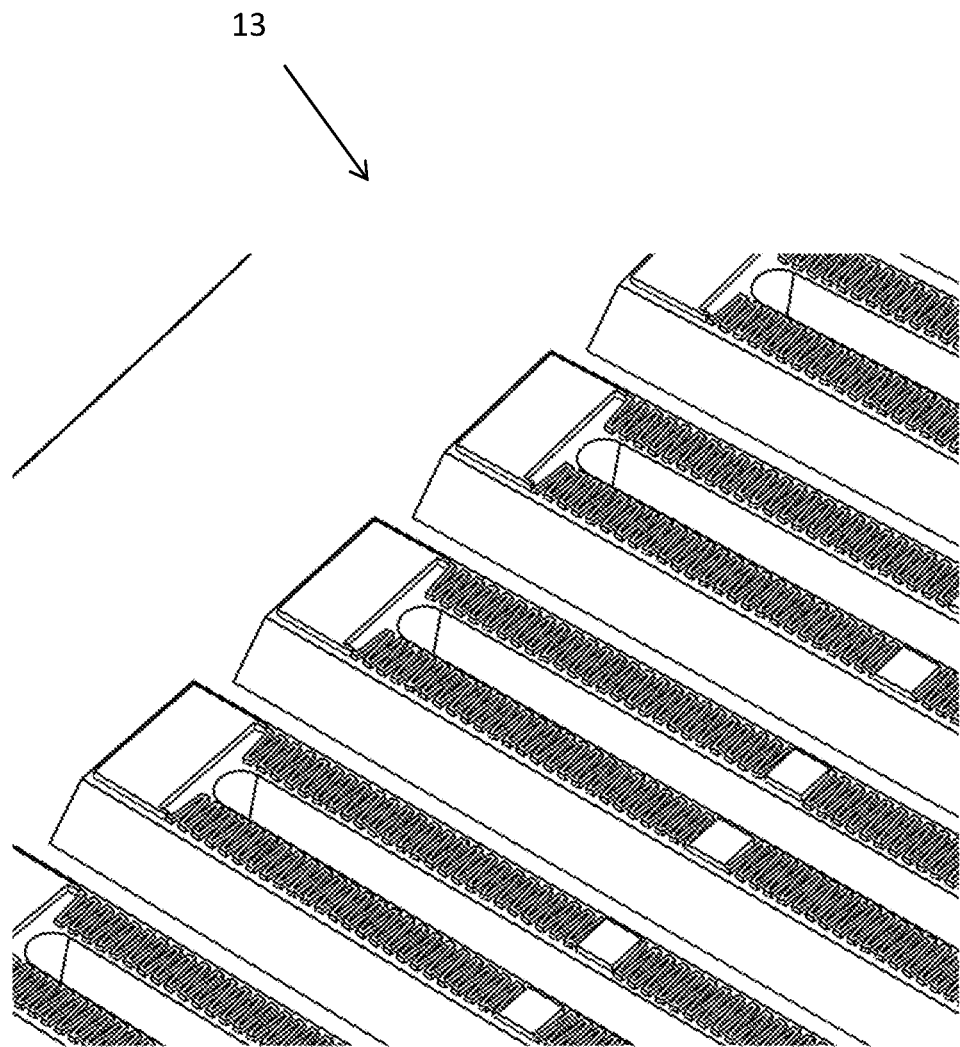
FIG. 13 is a close-up view FIG. 6, even greater magnification.
Figure 14:
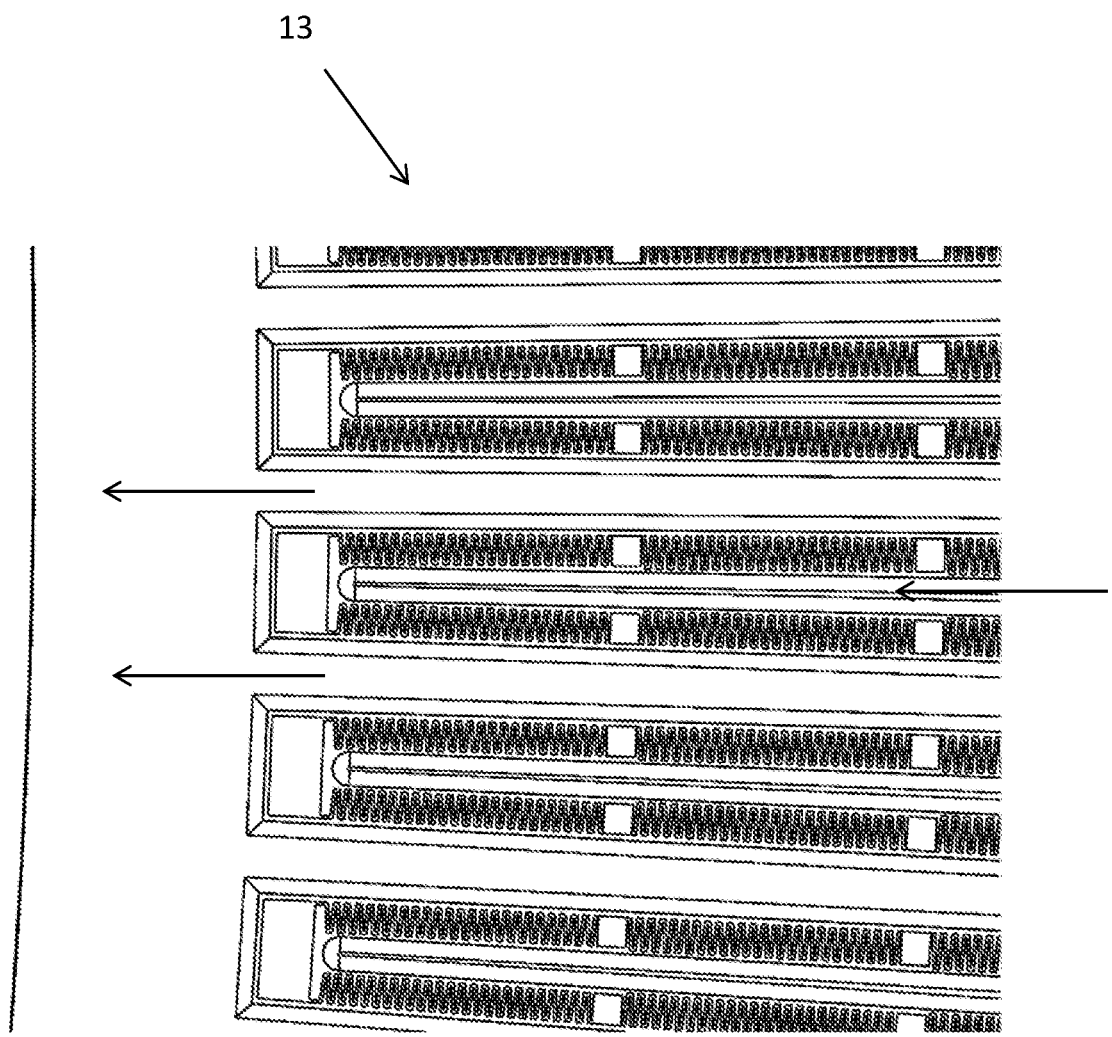
FIG. 14 is a top view of what is illustrated in FIG. 13.
Figure 15:
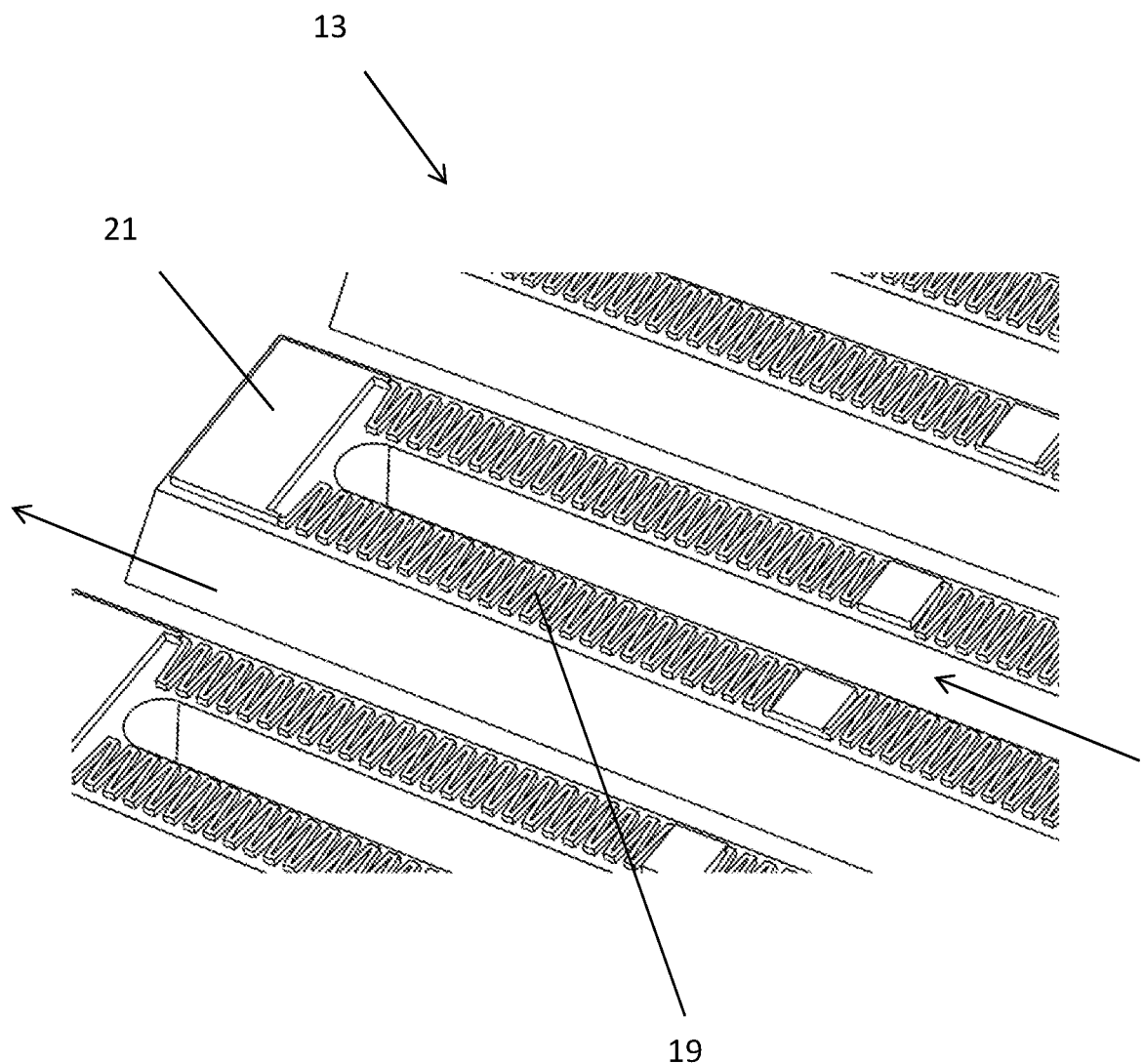
FIG. 15 is an even closer view of FIG. 13.
Figure 16:
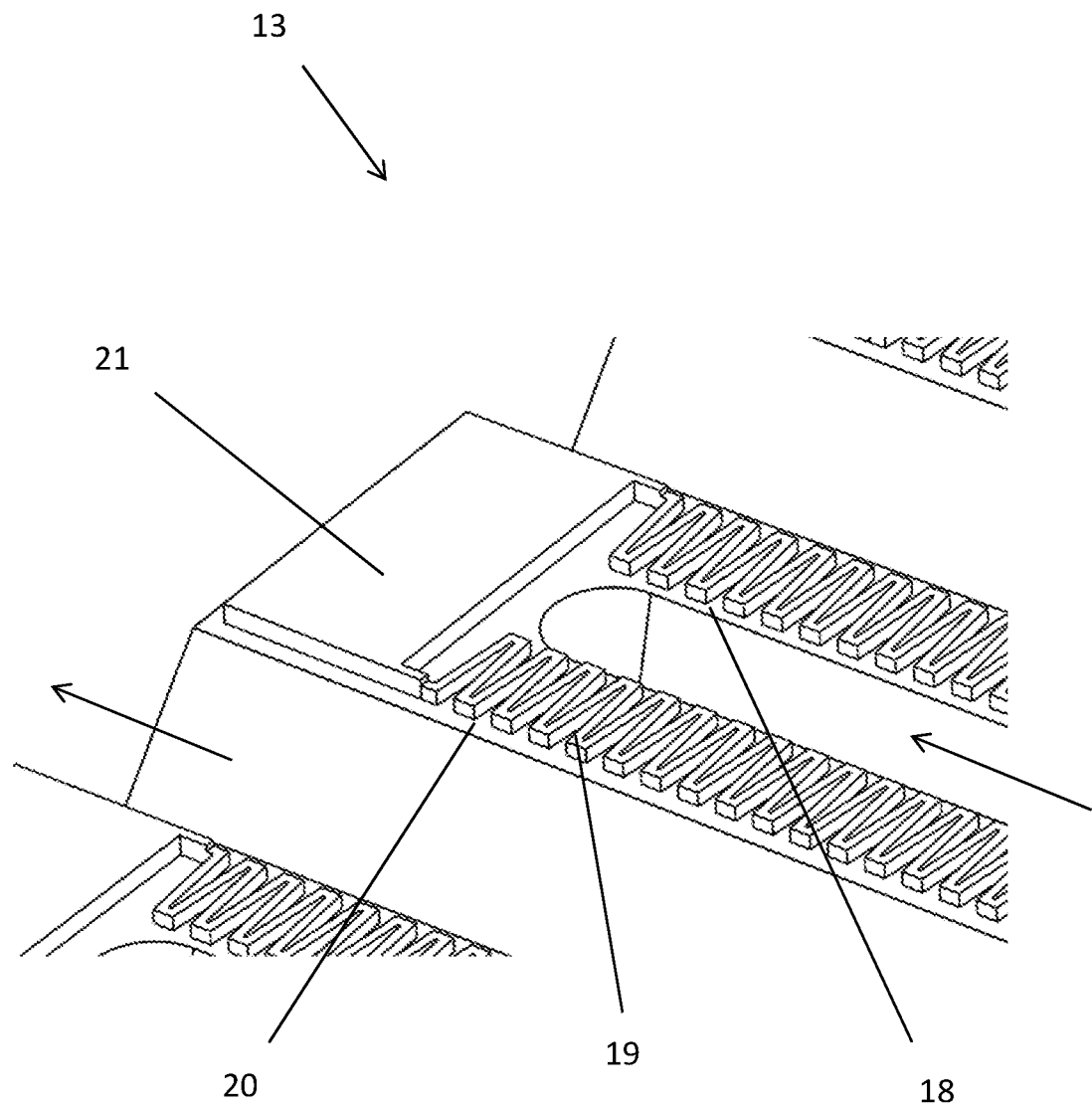
FIG. 16 is even closer than the view of FIG. 15.

FIG. 11 illustrates the difference in height of the micro W walls 19 and the raised pads 21. The top surface of the raised pads 21 on a first filter panel 11 is connected to the bottom of a second filter panel 11 that is situated on top of the first filter panel 11. The gaps, or pores, formed by the micro W walls 19 creates a space for the fluid to flow through. Particles that are larger in size than the gaps formed by the micro W walls 19 are retained in the gaps. For example, if the raised pads 21 were 10.5 microns tall and the micro W walls 19 were 10 microns tall the gap would be 0.5 microns tall. This gap would trap particles greater in size than 0.5 microns.

Referring now to FIGS. 12 through 16, the inboard section 13 of the filter panel 11 is shown. Alternating areas of micro W walls 19 and raised pads 21 ensure that the gaps between the micro W walls 19 and the mating filter panel 11 remains consistent.

Figure 17:
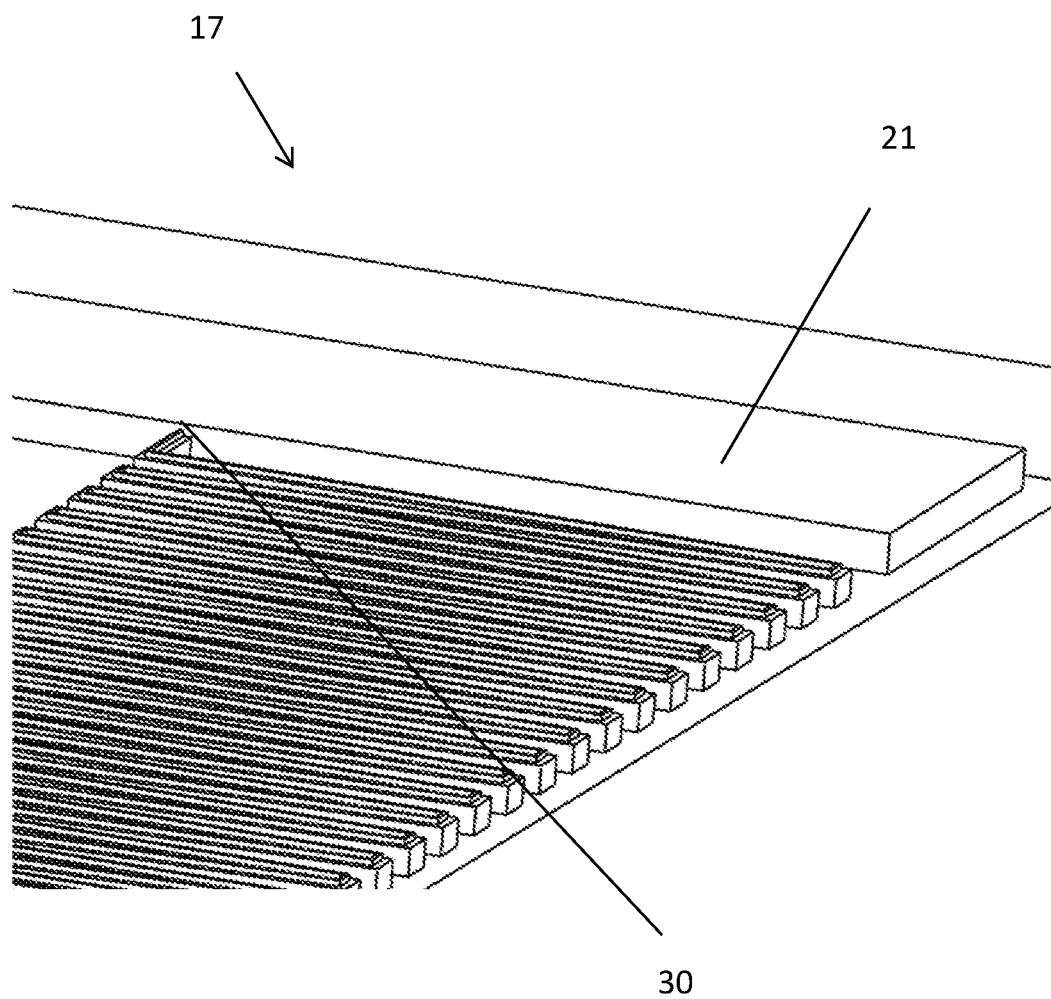
FIG. 17 is generally the same area shown in FIG. 11 with additional filter features.
Figure 18:
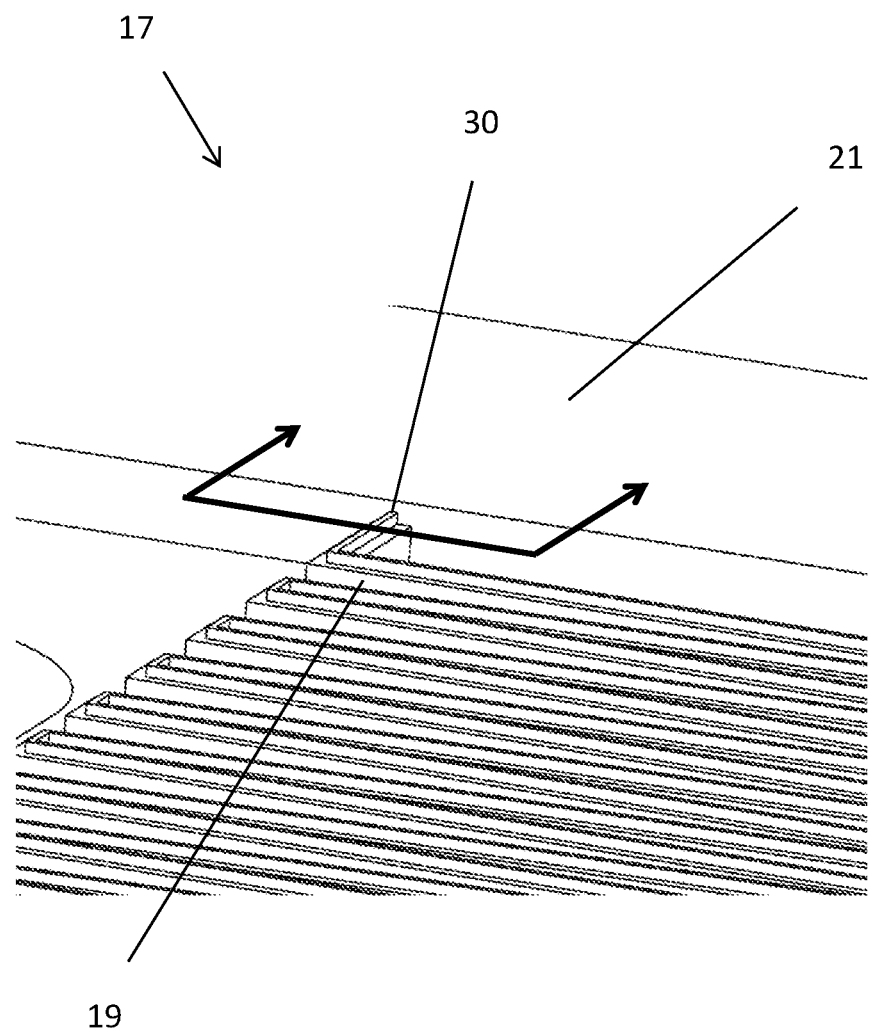
FIG. 18 is a closeup view of FIG. 17 showing the additional features in greater detail.

Referring to FIG. 17 and FIG. 18, an alternate configuration of the invention is disclosed. In this configuration the second micro walls 30 are shown located on top of the micro W walls 19. The second micro walls 30 are narrower than the micro walls 19. By adding the narrower second micro walls 30, the flow resistance is reduced. Flow resistance is directly proportional to the width of the wall (flow path length). By reducing the width of the wall from 10 microns to 3 microns the resistance is reduced by over a factor of 3. A third or fourth micro wall could be added with smaller and smaller widths to reduce the resistance further.

As mentioned earlier in this disclosure the preferred material for the filter panels 11 is plastic. However, other materials may be readily chosen by those skilled in the art. A mold will typically be used to form the features on the surface of the filter panels 11. Molds of this type are typically fabricated by nickel plating over a master pattern to create the features. The micro features, micro W walls and $2^{nd}$ micro walls of the master would typically be created by semiconductor processing techniques. Current semiconductor processing allows for the creation of single digit wide walls. So, the micro walls can be manufactured to be much smaller than what would typically be required for filter panels. For a filter panel with a 100 nm gap a wall width of 100 nm might be deployed.

Figure 19A:
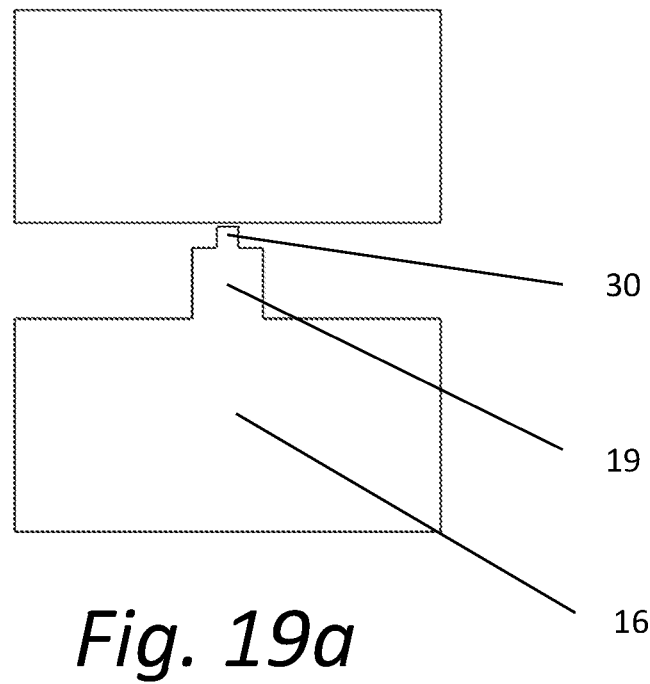
FIG. 19a shows a cross sectional view of the filter panels shown in FIG. 18.
Figure 19B:
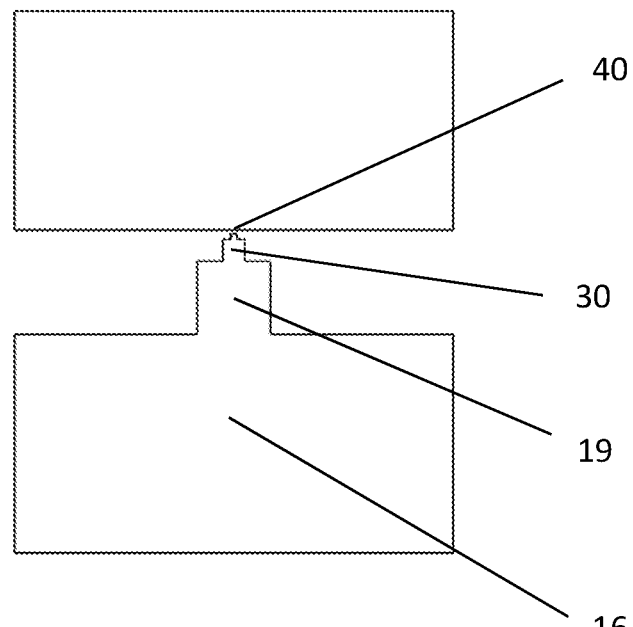

FIGS. 19a and 19b demonstrate that the reduction in the flow path length can be accomplished by employing differing width walls. FIGS. 19a-b show the wall configuration of FIG. 18 in cross sectional view. FIG. 19b shows a configuration in which a nano rib 40 has been added on top of the second micro W wall 30 to allow further control of the particle sizes to be filtered.

Figure 20:
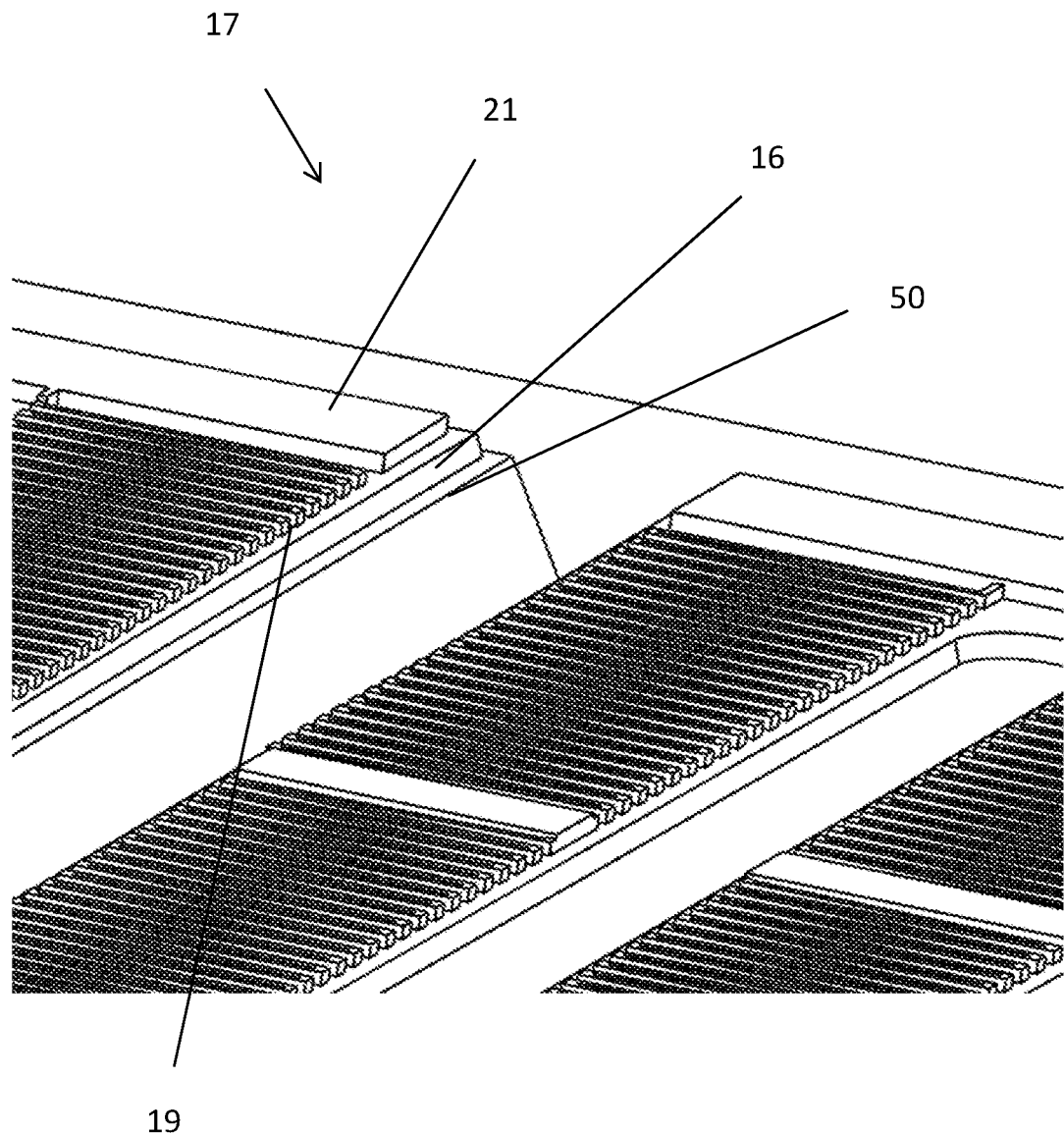
FIG. 20 shows generally the same area shown in FIG. 11 with an alternate set of additional filter features.

FIG. 20 shows an alternate configuration that may be utilized for the filter panel 11. The primary structure is shown with an additional stepped structure 50. The stepped structure 50 might be constructed so as to be 10 microns lower than the primary structures 16. Particles larger than 30 microns would be retained by the stepped structure 50. Smaller 15 micron particles would be retained at the edge of the primary structures 16. As mentioned above particles larger than 0.5 microns would be retained by the micro W walls 19. If second micro walls 30 are deployed with a gap of 0.2 microns, smaller particles would be retained by the second micro walls 30. This stepped nature of the structure of the filter panels 11 provides greater overall efficiency in the collection of particles, that is, more efficient filtering.

Figure 21:
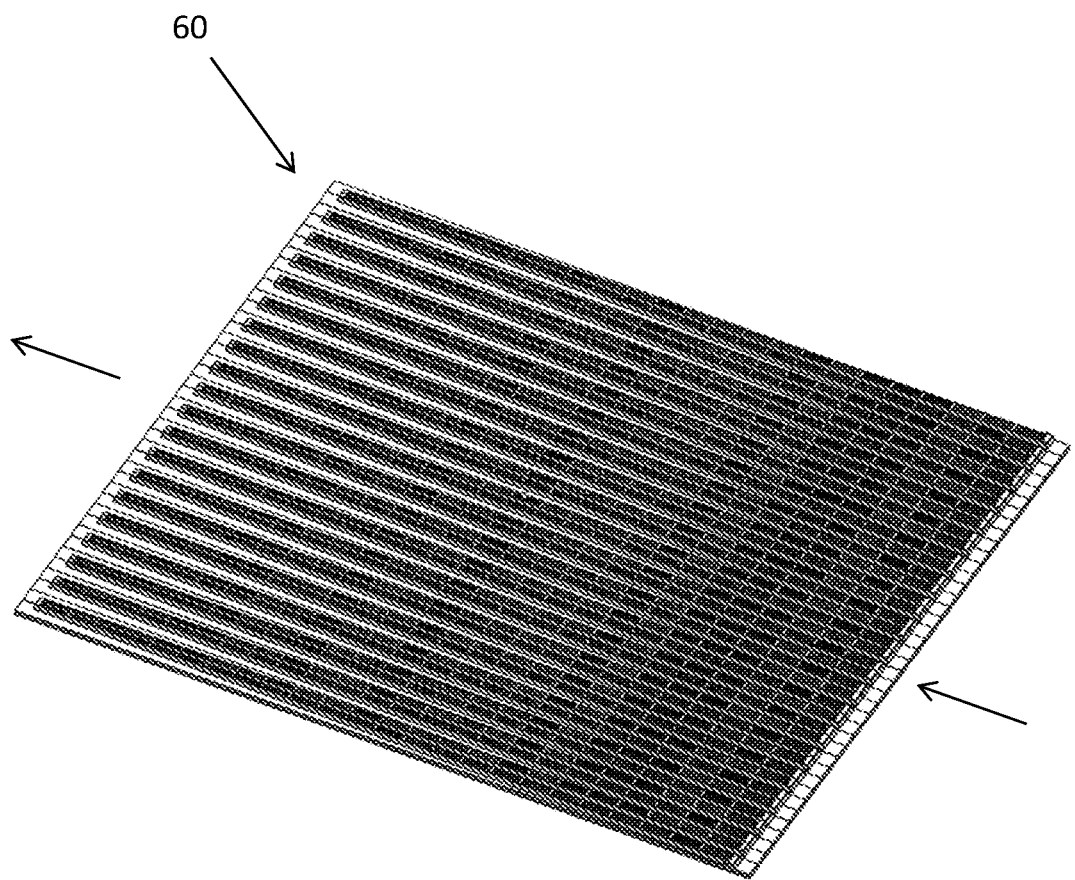
FIG. 21 Shows a rectangular configuration of the filter panel

FIG. 21 shows another modified configuration of the filter panel 11, a rectangular filter panel 60 with an inlet on a first edge and an outlet on an opposite edge. The features on the surface of the rectangular panel 60 would generally be the same as disclosed for the circular filter panel 11 except that the features would be in the form of a rectangular array rather than a radial array.

Figure 22:
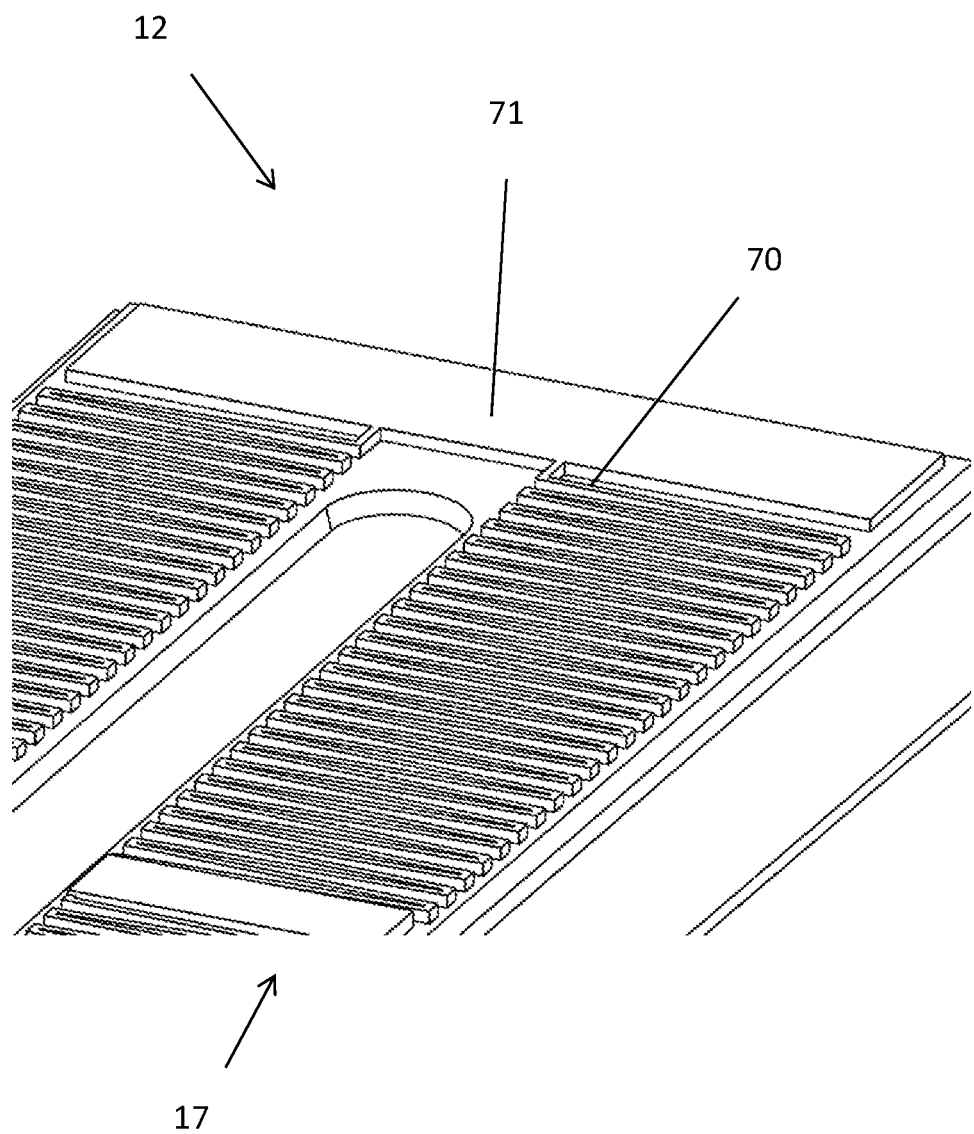
FIG. 22 Is a perspective view showing an alternate configuration with porous walls.

FIG. 22 depicts a modified construction in which the micro W walls 19 have been replaced with porous W micro walls 70. The porous W micro walls 70 are fabricated with a porous material. The porous material allows an additional path for fluid flow that results in further filtration. For ease of manufacturability, the rest of the filter panel might be fabricated from the same porous material. If the user wanted to have all of the fluid flow pass through the porous W micro walls 70, the raised pads 20 would be replaced with collinear pads 71 as shown in FIG. 22. The collinear pads 71 would be the same height as the porous W micro walls 70.

Figure 23:
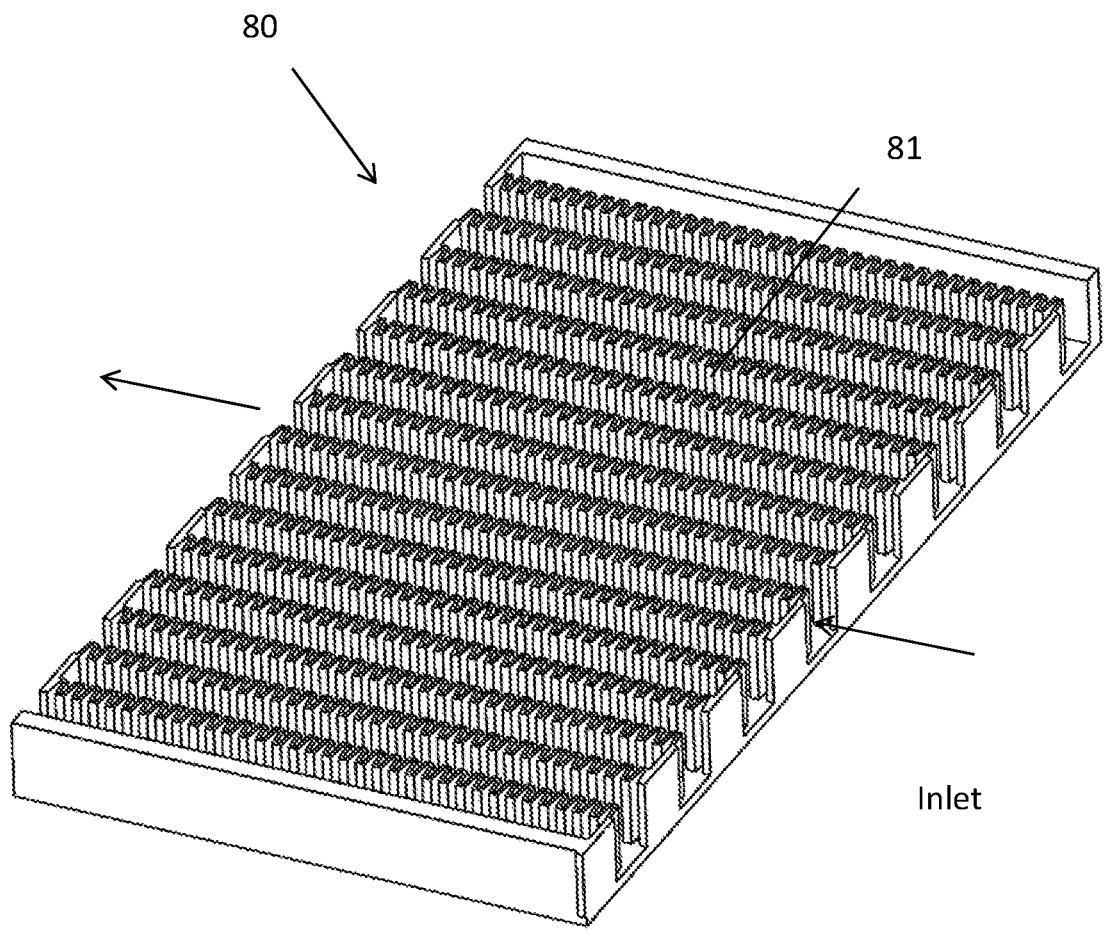
FIG. 23 Is a perspective view showing a second configuration with porous walls.
Figure 24:
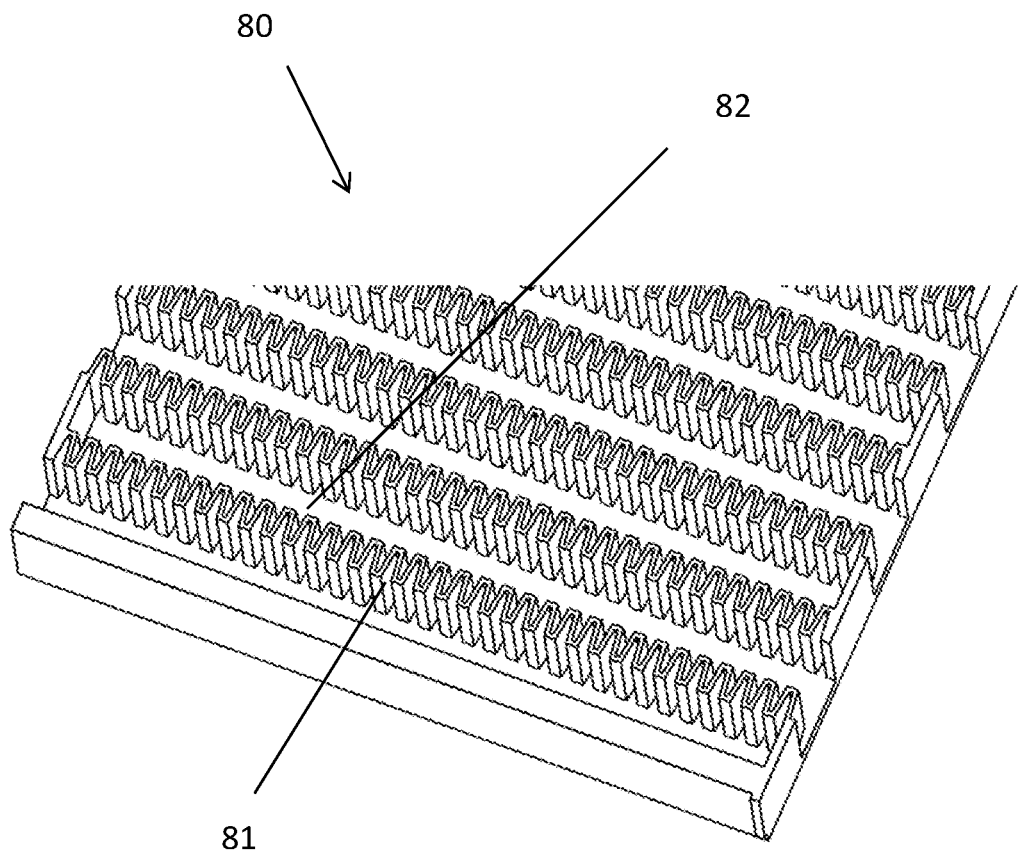
FIG. 24 Is a closeup view of FIG. 23.

Referring to FIG. 23 and FIG. 24, a further modification of the structural configuration utilizing the porous walls disclosed in FIG. 22 is shown. In this configuration the filter panel 80 is constructed with porous walls 81 that extend from the panel base 82 of the filter panel 80 to the lower surface of a second panel situated above the first panel filter 80.

Figure 25:
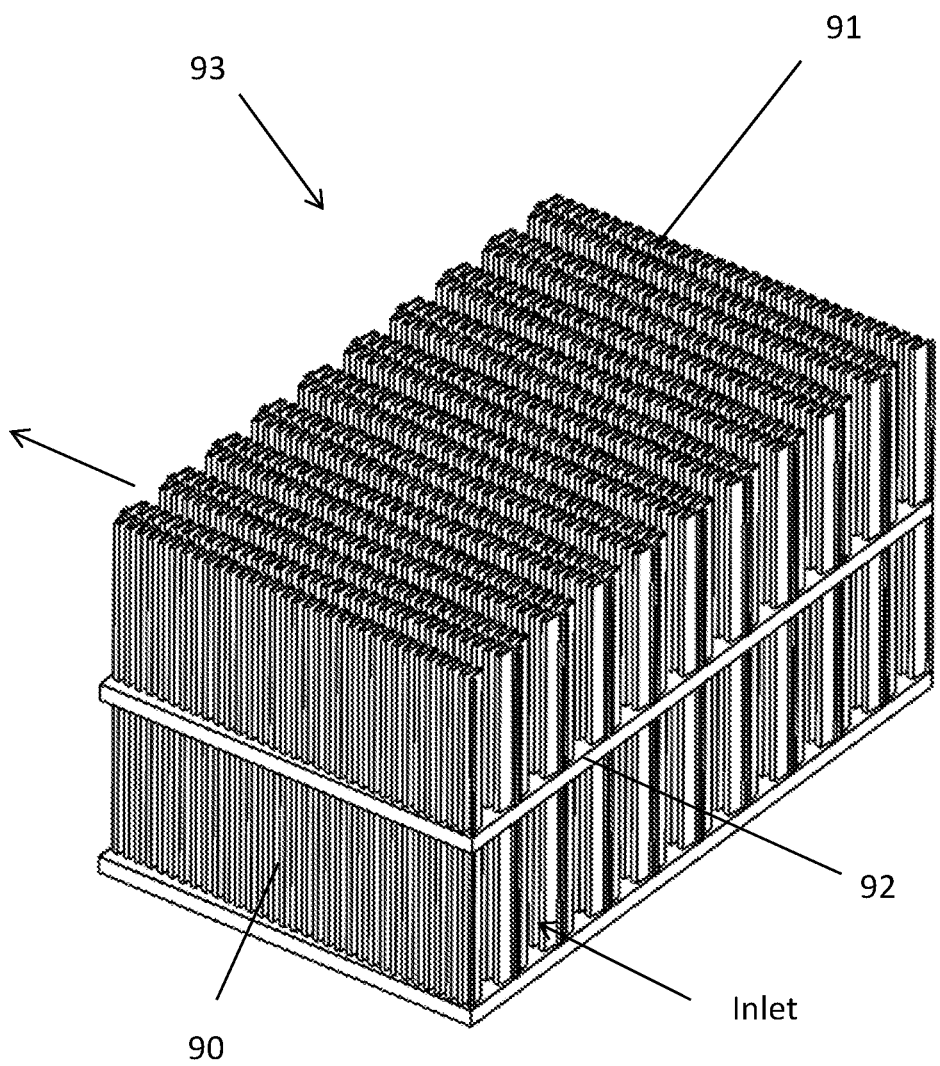
FIG. 25 Shows a perspective view of what is disclosed in FIG. 23 with different sized features and fabrication.

FIG. 25 shows a filter panel 90 that modifies the panel illustrated in FIGS. 22-24 by utilizing even taller porous walls 91. For manufacturing reasons the walls 91 might be fabricated independently from the divider wall 92. A filter stack 93 is shown with alternating layers of the tall porous walls 91 and divider walls 92. Only two layered sets are shown. Many more layers could be stacked on top of one another to increase the flow capacity of the filter panel 90.

As mentioned above, in most cases the preferred material for the filter panels is molded plastic. It should be noted that almost any type of material could be used for the panels. Ceramic might be deployed for high temperature applications of the filter or for caustic fluids such as acid.

The surfaces of the filters might be coated or have properties (of the base material) to enhance the functionality of the filter. Hydrophobic, hydrophilic, chemically reactive, electrostatic, biologically reactive, or any number of types of coatings could be applied. One knowledgeable in the art of material interaction with fluids could apply their knowledge to the disclosed filter structures.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

What is claimed is:

1. A filtering device, comprising:
   at least one filter panel, the at least one filter panel comprising a plurality of raised structures extending from a base, the raised structures forming fluid flow paths through the at least one filter panel, wherein the raised structures include W shaped walls and at least one nano rib, the at least one nano rib being placed on top of the W shaped walls, wherein the nano rib is in contact with a lower surface of a next in order filter panel in a filter stack comprising a plurality of filter panels; wherein
   characteristics of the raised structures define flow properties through the at least one filter panel the raised structures comprise uppermost surfaces, wherein the uppermost surfaces of the raised structures directly contact lower surfaces of next in order filter panels.

2. The filter device in claim 1, wherein:
   the filter stack is contained in a housing having an inlet and an outlet.

3. The filtering device according to claim 1, wherein:
   flow paths through the at least one filter panel are formed in spaces between adjacent raised structures.

4. The filtering device according to claim 1, wherein:
   the raised structures include at least two sets of the W shaped walls differing in configuration from each other.

5. The filtering device according to claim 1, wherein:
   at least one of the raised structures is made of a porous material.

6. A filtering device, comprising:

at least one filter panel, the at least one filter panel comprising a plurality of raised structures extending from a base, the raised structures forming fluid flow paths through the at least one filter panel, wherein the raised structures include W shaped walls and at least one nano rib, the at least one nano rib being placed on top of the W shaped walls, wherein the nano rib is in contact with a lower surface of a next in order filter panel in a filter stack comprising a plurality of filter panels; wherein characteristics of the raised structures define flow properties through the at least one filter panel, and at least one of the raised structures or the base are made of a porous material the raised structures comprise uppermost surfaces, wherein the uppermost surfaces of the raised structures directly contact lower surfaces of next in order filter panels.

7. The filtering device according to claim 6, wherein:

the filter stack is contained in a housing having an inlet and an outlet.

8. The filtering device according to claim 6, wherein:

flow paths through the at least one filter panel are formed in spaces between adjacent raised structures.

9. The filtering device according to claim 6, wherein:

the raised structures include at least two sets of the W shaped walls differing in configuration from each other.

\* \* \* \* \*